United States Patent [19]

Felix et al.

[11] Patent Number: 5,261,592
[45] Date of Patent: Nov. 16, 1993

[54] FRICTION WELDING MOLYBDENUM-RHENIUM ALLOY

[75] Inventors: Vinci M. Felix, Kennett Square, Pa.; David A. Wells, Newark, Del.

[73] Assignee: E. I. Du Pont de Nemours and Company, Wilmington, Del.

[21] Appl. No.: 949,287

[22] Filed: Sep. 22, 1992

[51] Int. Cl.⁵ .................... B23K 20/12; B23K 103/08
[52] U.S. Cl. .............................. 228/114.5; 228/263.19
[58] Field of Search ............ 228/112, 113, 114, 263.19

[56] References Cited

U.S. PATENT DOCUMENTS

| | | | |
|---|---|---|---|
| 3,568,298 | 3/1971 | Calton et al. | 29/470.3 |
| 3,973,715 | 8/1976 | Rust | 228/112 |
| 4,362,582 | 12/1982 | Danko | 148/127 |
| 4,621,760 | 11/1986 | King et al. | 228/112 |

FOREIGN PATENT DOCUMENTS

2137774 10/1984 United Kingdom ................ 228/112

OTHER PUBLICATIONS

"Molybdenum-Rhenium Alloys As Weldable Construction Materials", By R. Eck, 1986.
"Welding Molybdenum And Its Alloys", By Ing. Rudolf Lison, Julich, 1986.
"Effect Of Heat Treatment On Structure And Properties Of Alloys Based On Refractory Metals", By Yu. V. Mil'man, 1991.
"Free Choice, Combined Friction Welding With Flexible Timing Of Upsetting", Heinz Gruenauer, 1991.
"A Critical Evaluation Of Molybdenum And Its Alloys For Use In Space Reactor Core Heat Pipes", Los Alamos Scientific Laboratory, New Mexico, Mar., 1981.
"An Initial Evaluation Of Molybdenum-Rhenium Alloy For Reactor Heat Pipes", By M. A. Merrigan and L. B. Lundberg- Los Alamos National Laboratory, 1983.
"Recent Advances In Aerospace Refractory Metal Alloys", By J. Wadsworth, T. G. Nieh, and J. J. Stephens, 1988.
"Friction Welding", By the ASM Committee On Flash, Friction and Stud Welding Aug., 1971.
"Process Variables for the Friction Welding of Refractory Metals", M. V. Bolshakov 1982.

Primary Examiner—Mark Rosenbaum
Assistant Examiner—Jeanne M. Elpel
Attorney, Agent, or Firm—Michael K. Boyer

[57] ABSTRACT

The present invention relates to a process for friction welding molybdenum-rhenium alloys which include, from about 10% to about 50% by weight. The process of the invention comprises effecting a relative rotation of two MoRe work pieces at rim surface speeds up to about 4,000 to 8,000 inches per minute, forcing the work pieces into frictional contact under an axially applied pressure of about 3,000 to 20,000 pounds per square inch of interface surface.

11 Claims, 7 Drawing Sheets

FRICTION WELDING MOLYBDENUM-RHENIUM ALLOY

FIELD OF THE INVENTION

The present invention relates to the field of joining molybdenum alloy rods, tubes and pipes by friction or spin welding.

BACKGROUND OF THE INVENTION

Molybdenum (Mo) metal is used for various specialty applications which require its unusual properties. The melting point of molybdenum is 2630° C., over 1000° C. higher than iron, which permits using molybdenum for furnace parts, rocket nozzles and other high-temperature applications wherein most metals would melt or fail. Molybdenum also possesses exceptional resistance to corrosion by mineral acids when exposed to such acids in non-oxidizing conditions.

The mechanical properties of an article fabricated from molybdenum typically depend upon the conditions which are used to shape or work the metal. For best results, molybdenum is worked at a temperature below its recrystallization temperature, thereby avoiding recrystallization and grain growth within the article. When recrystallization is allowed to occur, molybdenum has a tendency to become brittle at relatively low temperatures, e.g., near room temperature and below. Recrystallization becomes particularly difficult to avoid should the manufacturing process employ brazing or welding because temperatures, which are sufficient to induce recrystallization, exist locally at the brazing or welding site. The tendency of recrystallized molybdenum to become brittle is a deterrent to its use in many applications.

Another difficulty arises when commercial molybdenum extrusion products are used for applications which require that rods, tubes or pipes be joined to extend their length, i.e., to form continuous lengths, and that the joined products be bent into a coil or curved object. While the ductility of such commercial molybdenum extrudates is usually satisfactory in the longitudinal direction, the transverse ductility is typically unacceptable, if not zero, which causes failure as a result of stress cracking when the extrudate is bent.

Molybdenum has been alloyed with rhenium (Re), which is a metal with a 3180° C. melting point. MoRe alloy pieces are conventionally welded by techniques which minimize welding temperatures, i.e., to avoid recrystallization, such as electron beam welding under an inert shielding gas or a high vacuum.

SUMMARY OF THE INVENTION

The present invention relates to a process for friction welding molybdenum-rhenium alloys (hereinafter "MoRe alloys"), and more particularly to friction welding MoRe alloys which range in rhenium content from about 10% to about 50% by weight. The process of the invention comprises generally the steps of effecting a relative rotation of two MoRe work pieces at rim surface speeds up to about 4,000 to 8,000 inches per minute, forcing the work pieces into frictional contact under an axially applied pressure (forge force) of about 3,000 to 20,000 pounds per square inch of interface surface, and sustaining this pressure until a total alloy burnoff of at least about 0.080 inches has been achieved, thereby forming a weld.

Conventional techniques such as electron beam welding for joining molybdenum rhenium alloys require an inert shielding gas or a vacuum environment. Such an environment is employed because molybdenum rhenium alloys typically oxidize at high temperatures. Moreover a molybdenum rhenium alloy has an increased high temperature strength and a higher melting point in comparison to molybdenum. Accordingly, it was a surprising and unexpected result of the present invention that friction welding MoRe alloy work pieces is feasible in air by using the parameters which are disclosed herein.

DETAILED DESCRIPTION OF THE INVENTION

Figure 1:
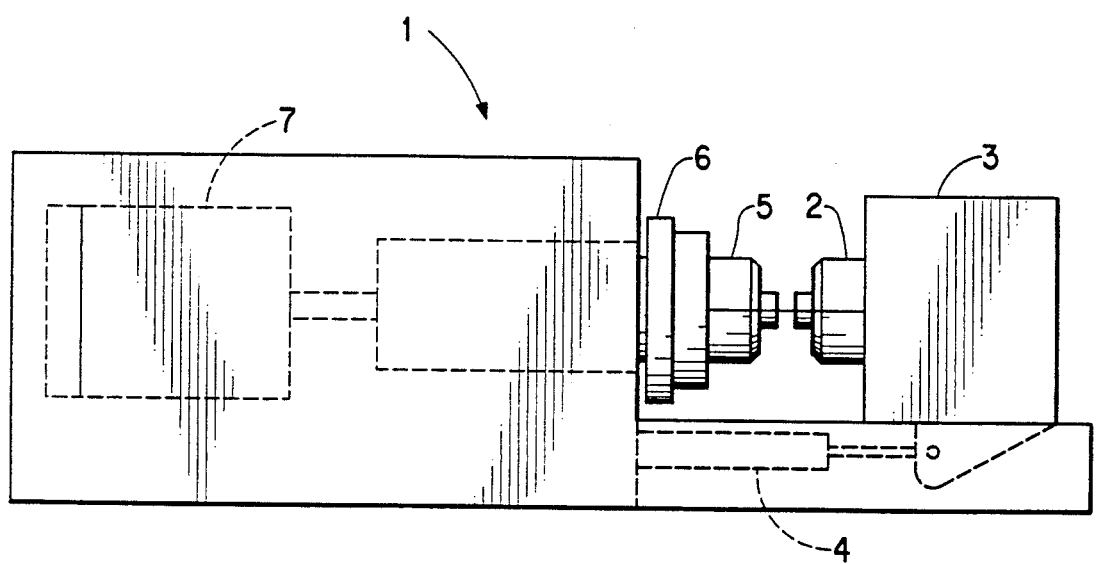
FIG. 1 is a cross-sectional schematic drawing of an apparatus which can be used to perform the friction welding of the present invention.

The present invention fills the need for continuous lengths of pipes, rods, and tubes, comprising corrosion resistant MoRe alloys that can be used for producing equipment which is employed for manufacturing alternative or replacement fluorocarbon compounds. The alternative or replacement fluorocarbons, known as hydrochlorofluorocarbons (HCFCs), and hydrofluorocarbons (HFCs) have a very low and zero ozone depleting potential, respectively, in comparison to conventional chlorofluorocarbon (CFC) compounds. Suitable techniques for manufacturing the replacement HCFCs and HFCs are disclosed in U.S. Pat. Nos., 4,258,225 and 4,967,024, which are hereby incorporated by reference. Such manufacturing techniques require using hydrogen fluoride in combination with high acidic, corrosive and erosive perfluorinated catalysts, such as tantalum pentafluoride (TaF$_5$), niobium pentafluoride (NbF$_5$), among others. These manufacturing techniques create an environment which is extremely acidic and corrodes conventional manufacturing equipment. The by-products of the corrosion process are released into the manufacturing process, thereby contaminating the resultant fluorocarbon, poisoning the perfluorinated catalyst, and causing undesired side-reactions. The present invention provides a method for fabricating continuous lengths of corrosion resistant molybdenum rhenium pipes, rods, and tubes which ameliorates, if not eliminates, the contamination associated with conventional manufacturing equipment. Examples of equipment which can be obtained from the molybdenum rhenium pipes, rods, and tubes of the invention includes a shaft of an agitator assembly, distribution rings, an internal heating coil and thermowell, among others.

The present invention relates to a process for friction welding molybdenum-rhenium alloys (hereinafter "MoRe alloys"), and more particularly to friction welding MoRe alloys which range in rhenium content from about 10% to about 50% by weight. In some cases, it is desirable to include about 10 to about 20 wt % tungsten, and about 30 to about 100 ppm carbon in the alloy composition. The tungsten typically increases the hardness of the alloy, and carbon can function as a de-oxidant.

The process of the invention comprises generally the steps of effecting a relative rotation between two MoRe alloy work pieces at rim surface speeds of up to about 4,000 to 8,000 inches per minute, forcing the work pieces into frictional contact under an axially applied pressure, i.e., forge force, of about 3,000 to 20,000 pounds per square inch of interface surface, and sustaining this pressure until a total alloy burnoff of at least about 0.080 inch has been achieved, thereby forming a weld.

Whenever used in the specification and appended claims the terms below are intended to have the following definitions.

"Work piece" is intended to refer to at least two articles comprising a MoRe alloy which are friction welded together to form a continuous length of the article. Examples of work pieces include pipes, rods, tubes, among others. While any suitable work piece can be employed in practice of the invention, work pieces are normally fabricated by extrusion or drawing.

"Forge force" is intended to refer to the force or pressure which is applied after the rotating work piece has been brought into contact with the stationary work piece. The force must be sufficient to allow the work pieces to intermix or meld together at the interface between the work pieces while avoiding excessive deformation of the work pieces.

"Weld" is intended to refer to the bond which is formed between the work pieces by frictional welding. A weld is obtained by localized heating of the interface between the work pieces, which is generated between the rotating and stationary work pieces, and pressing the work pieces together such that the interface will meld, and subsequently fuse together when cooled. The temperature which is generated during welding is less than about the melting point of the work pieces. "Burnoff" is intended to refer to loss or removal of a certain quantity of the work pieces from the interface which is exposed to friction. Burnoff can occur as a result of localized heating of the work pieces which is sufficient to cause volatilization, mechanical abrasion, among other causes.

"Friction Force" is intended to refer to energy which is generated as a result of the rotating work piece being contacted with the stationary work piece. The friction force functions to convert mechanical energy into heat which is employed to form a weld between the work pieces.

The process of the invention for friction welding molybdenumrhenium alloys generally comprises the steps of:

providing a friction welding machine which includes a stationary check for holding one MoRe alloy work piece, and a rotatable chuck for holding the second MoRe alloy work piece, placing one MoRe alloy work piece into the stationary chuck, and a second one into the rotatable chuck, driving the rotatable chuck to achieve a work piece rim surface speed of about 4,000 to 8,000 inches per minute relative to the stationary work piece, forcing the work pieces into fictional contact under an axially applied pressure of about 3,000 to 20,000 pounds per square inch at the interfacial surface of the work pieces, not;

sustaining the axial pressure until a total burnoff of at least about 0.080 inches has occurred, allowing the work pieces to cool; thereby fusing the work pieces together and forming a bond or weld therebetween.

Any friction welding machine of commercial design is suitable for practicing the invention which is capable of attaining the required work piece rim speed and applying the necessary forge force. The machine can be operated in air, and either a horizontal or vertical fashion. An example of a suitable commercial friction welding machine is illustrated in FIG. 1. Referring now to FIG. 1, the frictional welding machine comprises a frame 1 for housing a stationary chuck 2 which is mounted on a tailstock fixture 3 that is equipped for axial movement by a hydraulic drive or transmission, and with a pressure control device 4 to exert and monitor the axial pressure. The machine further comprises a rotatable chuck 5 which is centered along the longitudinal axis of the stationary chuck 2 and adapted to receive flywheels 6 of differing mass. Power is normally supplied to rotatable chuck 5, for example, by a hydraulic transmission 7. An example of a suitable friction welding machine possesses a 100 to 400 Horsepower transmission and is capable of providing a maximum axial load which ranges from about 224,000 to 358,400 lbs.

By contacting one end of a rotating work piece to an end of the stationary work piece, the welding machine applies a frictional force that causes the interface between in the work pieces to generate heat which in some cases is sufficient to induce plastic metal flow. The welding machine also applied a forge force along the longitudinally axis of the work pieces, typically at the end of the friction heating cycle, which causes the heated ends of the work pieces to intermingle such that the ends will consolidate or fuse together when cooled; thereby forming the weld. Normally, the forge force is applied after rotation of the work piece has ceased. Usually, the forge force is approximately twice the friction force.

When performing the friction welding of the invention, normally a work piece in the rotatable chuck is revolved at high velocity while a work piece in the stationary chuck is forced against the rotating work piece. As the ends of the two work pieces are brought into contact, the frictional heat increases until the work pieces reach the welding temperature. For best results, aft the work pieces have been brought into contact the transmission is disconnected, e.g. power is no longer supplied to the transmission. In some cases, a portion of the work pieces becomes molten, and is expelled from the machine, e.g. as a result of centrifugal force. Expelling molten work piece is known as flashing or upsetting; the material lost is called burnoff. The rotating chuck eventually stops rotating, and then the forge force is applied to consolidate the weld.

The rotational velocity or rim speed of the work piece within the rotating chuck is sufficient to overcome the frictional forces which are generated when the ends of the work pieces are brought into contact. Rim speed is determined by measuring the velocity of a point on the circumference at the end of the work piece. The optimum rim speed for a particular MoRe alloy work piece will vary with the rhenium content of the alloy, geometry of the work pieces, previous working and annealing history of the work pieces, among others. For example, a relatively high velocity or rim speed will generally result in excessive heat at the joint and excessive alloy waste due to excessive burnoff, whereas a relatively low rim speed can produce an unacceptable weld. Normally, a rim speed which ranges from about 4,000 to 8,000 inches per minute is sufficient to form a weld. Should at least one of the work pieces comprise a rod, the rim speed at the center of the rod's end will approach zero. Such low rim speeds may require that rods, which have a relatively large cross-sectional diameter, be machined for providing a projection or protuberance that is located at the end of the work piece, e.g., the center of the interface. The projection serves to increase the frictional forces at the center of the rods. In other words, providing a protuberance on at least one end of the work pieces, increases the surface area of the work piece interface thereby ensuring frictional generation of heat which is adequate to permit the work pieces to be welded together.

An axial pressure or a forge force along the longitudinal axis of the work pieces is also employed for generating frictional heat which permits the work pieces to be welded together. The optimum forge force for a particular MoRe alloy work piece will vary with the rhenium content of the alloy, previous working and annealing history of the work piece, among other factors. A relatively how forge force may create an unacceptable weld, whereas a relatively high force force may induce excessive heat generation at the joint and undue alloy burnoff. A forge force, which is a function of the composition and rim speed of the work pieces, is capable of producing a weld that possesses a strength e.g., bend strength, of about 85 to 100% of the unwelded work pieces. Preferably, the weld has a strength which is at least about 90 to 100% of the unwelded work pieces. For example, a forge force for welding MoRe work pieces may range from at least about 8450 to about 30,000 psi.

Friction welding may cause localized heating of the work pieces which is sufficient to cause volatilization, mechanical abrasion, among other causes, or "burnoff" that removes a portion of the work pieces. However, the amount of the work pieces which is removed by burnoff can be monitored for determining the progress or extent of the friction welding process. The optimum burnoff for a particular MoRe alloy work piece will vary with the rhenium content of the alloy, previous working and annealing history of the work piece used, among other factors. For example, a burnoff can remove at least about 0.08 inch from the length of the work pieces. In some cases, the amount of burnoff is sufficient to form an upset or burr around the exterior surface of the joined work pieces.

Normally, the work pieces which are friction welded together can be at least about 5 inches in cross-sectional diameter, and virtually any length. In some cases, one or more of the work pieces comprises a pipe or tube which has a cross-sectional diameter of at least about 4 inches, and wall thickness of at least about 1 inch. However, the invention may be employed to friction weld together work pieces which have a virtually unlimited array of shapes and sizes. For example, work pieces which have differing shapes, sizes, alloy compositions, among others, can be welded together by practicing the present invention. However, the size and shape of the work pieces must be considered when determining the appropriate friction welding parameter.

In one aspect of the invention, the properties of the weld are improved by heat treating, e.g. heat treating in a manner which avoids recrystallization of the alloy. For example, the completed weld can be heat treated, e.g., annealed, for increasing the bend strength of the weld. Further, when a MoRe alloy work piece is fabricated by extrusion, the properties of the weld can be enhanced by annealing the work piece prior to friction welding. Annealing can be performed by heating the MoRe alloy within a protective atmosphere, e.g., a vacuum or under an inert gas, to a temperature which ranges from about 850° to about 1,100° C. for a time that is sufficient to relieve stresses within the alloy, e.g., 5 minutes–3 hours. In some cases, substantially only the weld can be annealed by locally heating the weld by using an high frequency (HF) coil within a vacuum environment. After appropriate annealing, the MoRe alloy work piece and/or weld possesses improved ductility thereby increasing the strength of the weld, and the angle to which welded work pieces can be bent without adverse effects.

In another aspect of the invention, the weld and/or the area adjacent thereto is machined. The friction weld which is formed in accordance with the invention, typically produced an upset or burr that extends outwardly from the weld. The upset can be readily removed by machining should a more uniform exterior surface be desirable. Moreover, prior to friction welding, the work pieces can be machined in order to obtain a weld having a predetermined configuration and/or to enhance the friction welding process, e.g., machining to provide a projection on the end of a work piece.

While particular emphasis has been placed upon friction welding two work pieces which comprise a MoRe alloy, the present invention can be used to join a MoRe work piece to another work piece which comprises a metallic material that has a melting point which ranges from about least about 2600° to about 3400° C. of the MoRe alloy.

Certain aspects of the invention are demonstrated by the following Examples which were conducted in air using a Mo13% Re alloy and a Mo 41% Re alloy. It is believed that the methods used in the following friction welding Examples are applicable to molybdenum rhenium alloys which contain from about 10% to 50% by weight rhenium. It is to be understood that the following Examples are provided to illustrate and not limit the scope of the appended claims.

EXAMPLE 1

A Mo41% Re rod about 10.8 feet in length, and about 0.472 inches in diameter was cut and dry machined flat faced into nominal 2.5 inch lengths for weld tests. The friction welding conditions, which were used to form welds 1–18, are summarized below in Table 1.

Welds 1 to 6 were carried out on a FW2 friction welding machine (supplied by The Welding Instituted, Abington Hall, U.K.). While the FW 2 friction welding machine was capable of producing welds which possessed an Ultimate Tensile Strengths (UTS) of up to about 155.9 ksi (ksi = 1,000 psi), and a rim speed of about 5,000 revolutions/minute (rpm), i.e., about 7,400 inches per minute, it is believed that the FW2 machine lacked adequate power to form acceptable welds in accordance with the invention. Therefore, the rotation speed was reduced to 3325 rpm (4920 inches per minute rim speed), in an attempt to increase the available torque at the weld interface. This proved to be unsatisfactory because the machine stalled before complete burnoff was achieved. In order to compensate for the lack of power, subsequent welds were produced using an FW11 friction welding machine (supplied by The Welding Institute, Abington Hall, U.K.), which as demonstrated by the Friction and Forge Forces set forth in Table 1, has an increased power capability.

Weld 7 was produced, and tensile tested by using a 112,000 lbs Denison Testing Machine. Failure occurred through the weld interface at an Ultimate Tensile Stress (UTS) value of about 84 ksi. Without wishing to be bound by any theory or explanation, it is believed that this relatively low result was caused by slippage of the stationary work piece within the work piece holder at the beginning of the welding cycle. Weld 8 stalled during formation as a result of a too high friction force being applied. Weld 9 was produced by applying a lower force which resulted in a UTS of about 136.9. Welds 10 and 11 were produced with reduced forge pressures and shorter burnoffs than the previous welds. Welds 10 and 11 achieved tensile values of about 143.4 ksi and 144.7 ksi, respectively.

Welds 12 to 14 were produced using substantially the same parameters as Weld 11, and were tested for tensile strength and ductility. Weld 12 failed at the juncture between the parent metal, i.e., the metal prior to welding, and the weld. However, the welded joint remained intact, and had a tensile test value of about 139.5 ksi. Weld 13 was subjected to bend testing, and withstood being bent 90 degrees without failure.

Figure 2:
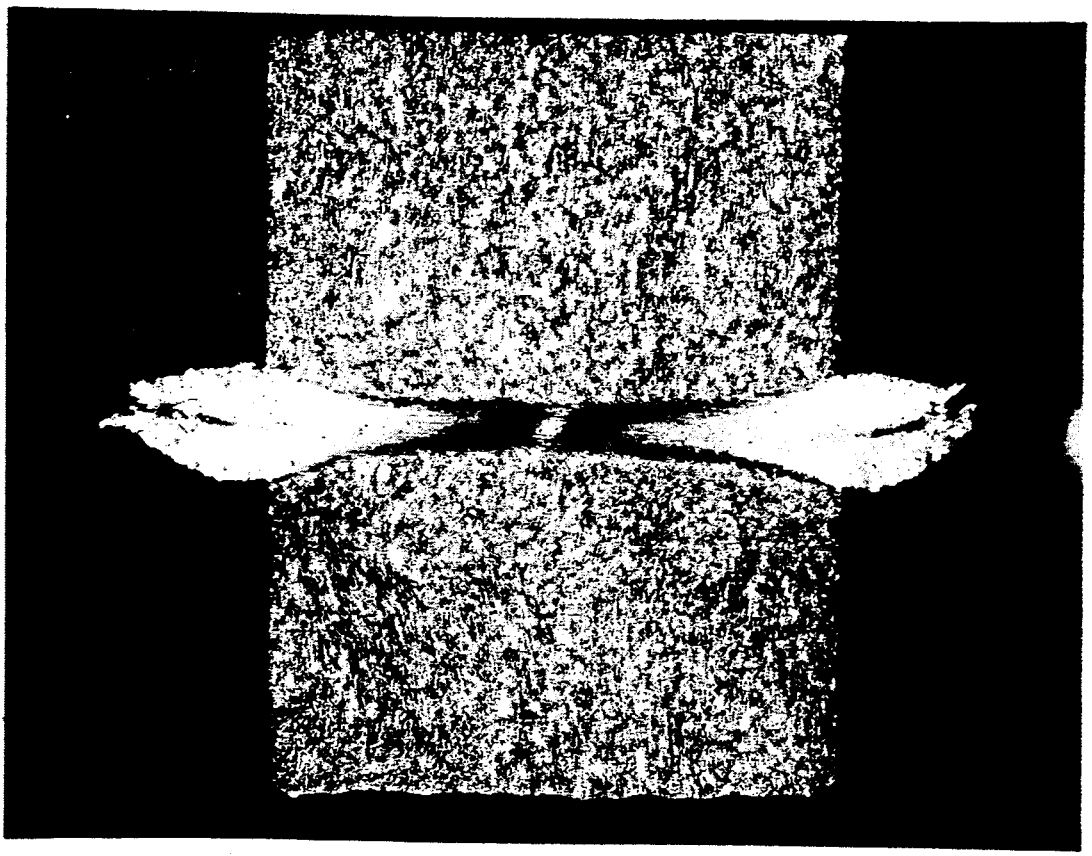
FIG. 2 is a photograph of a macro-section at 7× magnification which illustrates a friction weld formed between two Mo41% Re rods.
Figure 3A:
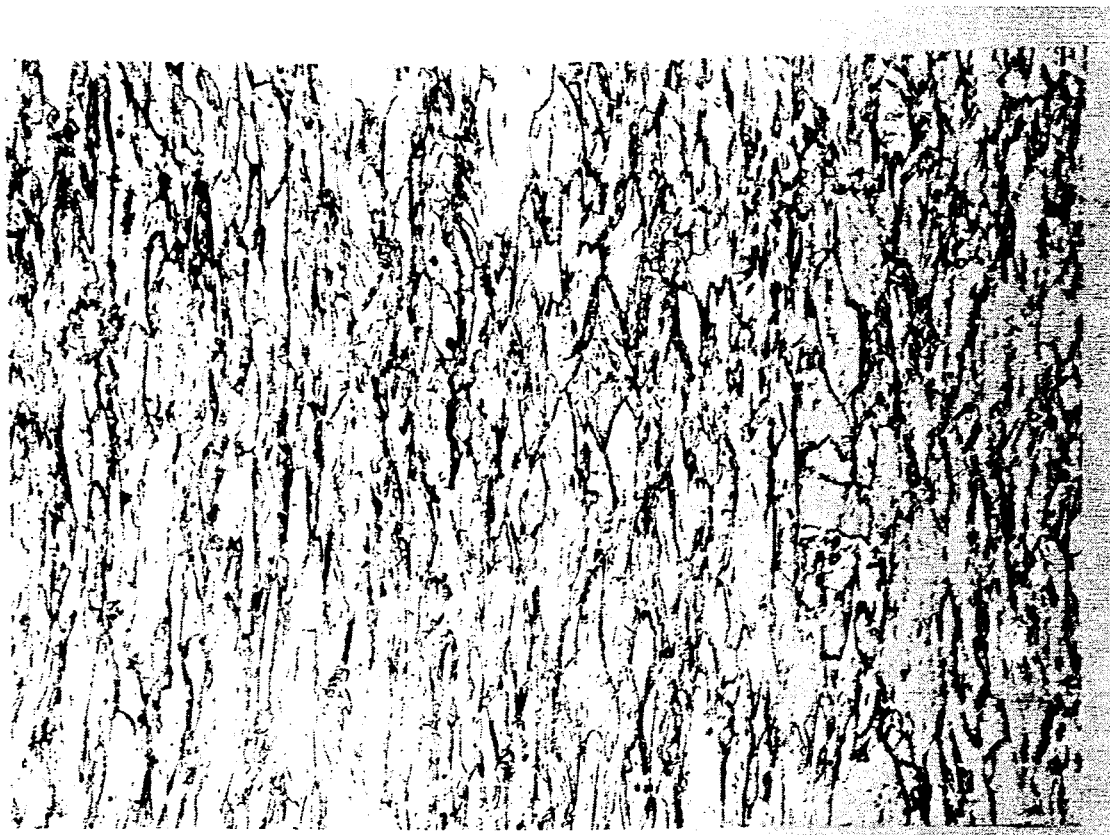
FIG. 3A is a photomicrograph at 100× magnification of a section of a Mo41% Re rod prior to forming the weld illustrated in FIG. 3B.
Figure 3B:
FIG. 3B is photomicrograph at 100× magnification of a section of a friction weld formed between two Mo41% Re rods.

Weld 14 was sectioned, etched, and polished, for metallographic examination and showed a fully bonded weld interface which is illustrated in FIG. 2 that is a macrosection of weld 14 at 7× magnification. FIGS. 3A and 3B are photomicrographs taken at 100× magnification, respectively, of the MoRe alloy prior to welding, and a section of the resultant weld 14. The upper portion of FIG. 3B corresponds to Mo14% Re alloy which is generally unaffected by the welding process.

Welds 11 through 18 were produced for demonstrating that the friction welding process of the invention can consistently produce acceptable welds between MoRe alloys.

The conditions for the above series of weld tests are summarized in the following Table 1:

TABLE 1

(Mo 41% Re Rod)

| Weld No. | Machine | Rim Speed in./min. | Friction Force, psi | Forge Force, psi | Burn-off inches | Weld UTS, ksi |
|---|---|---|---|---|---|---|
| 1 | FW2 | 7400 | 10240 | 12030 | 0.24 | 138.2 |
| 2 | FW2 | 7400 | 6140 | 12030 | 0.12 | 155.9 |
| 3 | FW2 | 7400 | 3070 | 4610 | 0.08 | 115.1 |
| 4 | FW2 | 7400 | 3070 | 4610 | 0.12 | 130.8 |
| 5 | FW2 | 4920 | 3070 | 4610 | 0.08 | 136.9 |
| 6 | FW2 | 4920 | 3070 | 4610 | 0.04 | 147.8 |
| 7 | FW11 | 4440 | 6400 | 12800 | 0.12 | 84.0 |
| 8 | FW11 | 4440 | 12800 | 25600 | 0.08 | no weld |

TABLE 1-continued (Mo 41% Re Rod)

| Weld No. | Machine | Rim Speed in./min. | Friction Force, psi | Forge Force, psi | Burn-off inches | Weld UTS, ksi |
|---|---|---|---|---|---|---|
| 9 | FW11 | 4440 | 8450 | 15360 | 0.16 | 136.9 |
| 10 | FW11 | 4440 | 8450 | 11260 | 0.12 | 143.4 |
| 11 | FW11 | 4440 | 8450 | 8450 | 0.08 | 144.7 |
| 12 | FW11 | 4440 | 8450 | 8450 | 0.08 | 139.5 |
| 13 | FW11 | 4440 | 8450 | 8450 | 0.08 | note 1 |
| 14 | FW11 | 4440 | 8450 | 8450 | 0.08 | |
| 15 | FW11 | 4440 | 8450 | 8450 | 0.08 | 138.7 |
| 16 | FW11 | 4440 | 8450 | 8450 | 0.08 | 144.7 |
| 17 | FW11 | 4440 | 8450 | 8450 | 0.08 | note 1 |
| 18 | FW11 | 4440 | 8450 | 8450 | 0.08 | note 1 |

Note 1:
Weld was bend tested by being bent around a stationary cylindrical jig, and achieved 90 degree bend without failure.

EXAMPLE 2

Example 2 illustrates the effects of friction welding a MoRe alloy which has a reduced Re content.

A Mo 13% Re rod approximately 10.9 feet in length and 0.472 inch in diameter was cut and by machined flat faced into nominal 2.5 inches lengths for weld tests. The friction welding conditions which were used to form welds 1-21 are summarized below in Table 2.

Welds 1 to 4 were carried out on a FW11 friction welding machine (supplied by The Welding Institute, Abington Hall, U.K.). Weld 1 was produced substantially in accordance with the friction welding conditions which were used to form welds 11-18 in Example 1. Weld 1 was subjected to a tensile evaluation, and failed at a UTS of about 77.5 ksi which produced a brittle fracture surface.

The welding conditions that provided the most favorable and reproducible results correspond to Weld 14, which achieved a tensile failure, through the weld interface, at a UTS of about 83.8 ksi.

Figure 4:
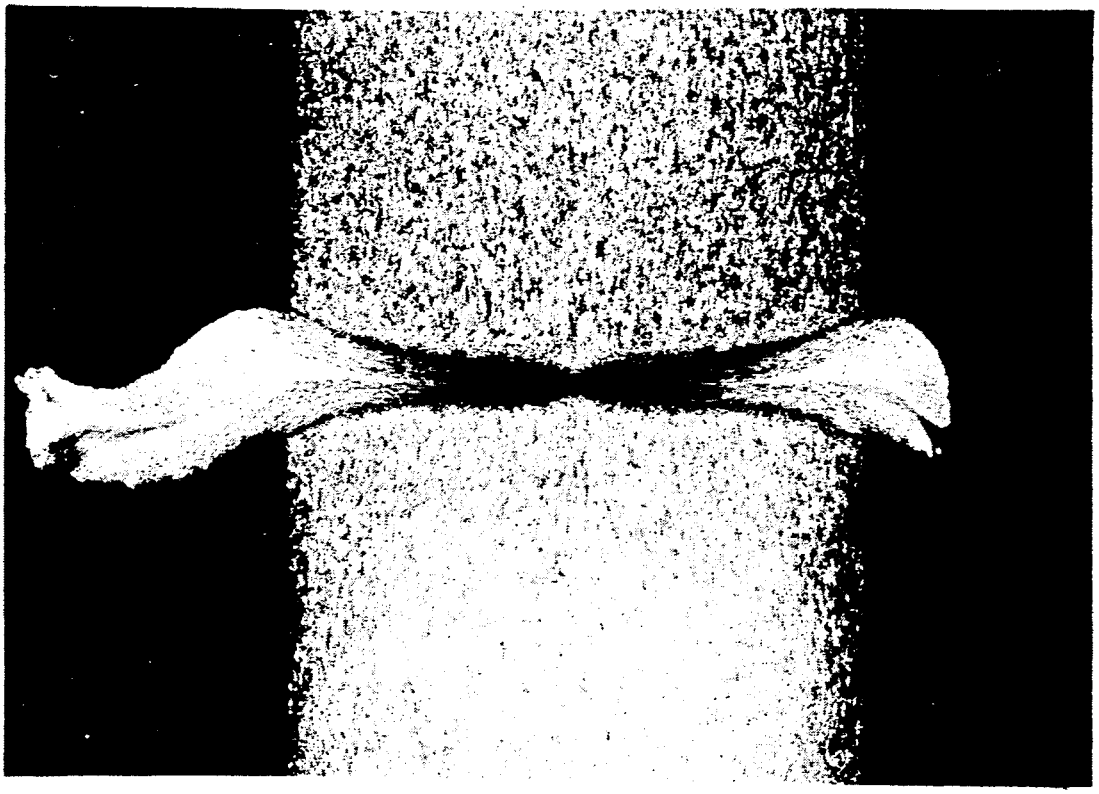
FIG. 4 is a photograph of a macro-section at 7× magnification which illustrates a friction weld formed between two Mo13% Re rods.
Figure 5A:
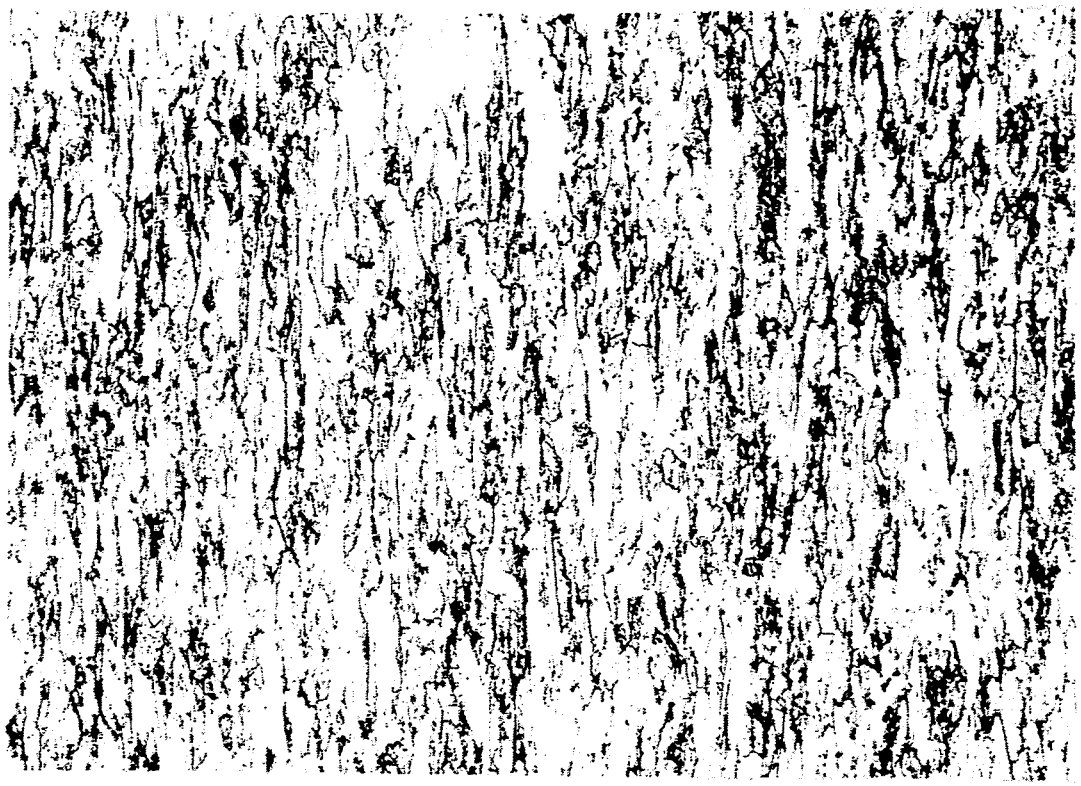
FIG. 5 is a photomicrograph at 100× magnification of a section of a Mo13% Re rod prior to forming the weld illustrated in FIG. 5B.
FIG. 5B is a photomicrograph at 100× magnification of a section of a friction weld formed between two Mo13% Re rods.
Figure 5B:
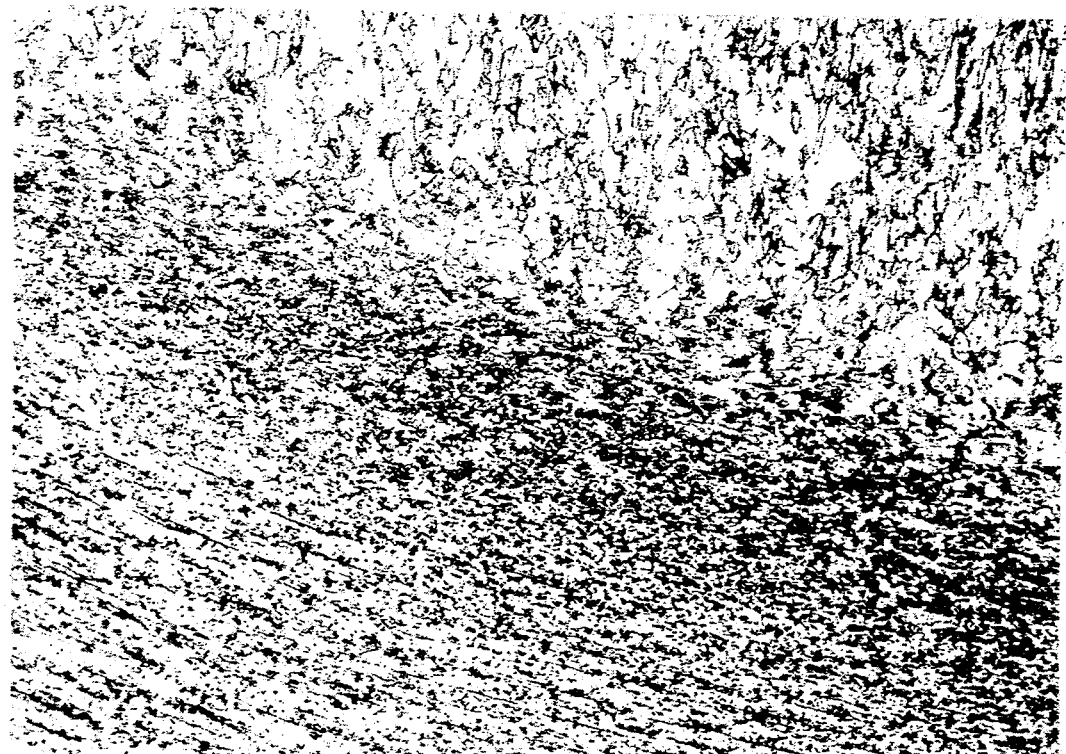

Weld 21 was sectioned, etched, and polished, for metallographic examination, which showed a fully bonded weld interface, that is illustrated in FIG. 4 which is a macrosection of weld 21 at 7× magnification. FIGS. 5A and 5B are photomicrographs taken at 100× magnification, respectively, of the Mo13% Re alloy prior to welding, and a section of the resultant weld 21. The upper portion of FIG. 5B corresponds to Mo13% Re alloy which is generally unaffected by the welding process.

The conditions for the above series of tests are summarized in the following Table 2:

TABLE 2

(Mo 13% Re Rod)

| Weld No. | Machine | Rim Speed in./min. | Friction Force, psi | Forge Force, psi | Burn-off inches | Weld UTS, ksi |
|---|---|---|---|---|---|---|
| 1 | FW11 | 4400 | 8450 | 8450 | 0.080 | 77.5 |
| 2 | FW11 | 4440 | 8450 | 8450 | 0.060 | 87.4 |
| 3 | FW11 | 4440 | 8450 | 11260 | 0.120 | 47.9 |
| 4 | FW11 | 4440 | 8450 | 8450 | 0.040 | 83.1 |
| 5 | FW2 | 4920 | 3070 | 4610 | 0.040 | 78.6 |
| 6 | FW11 | 4440 | 8450 | 15360 | 0.060 | 79.7 |
| 7 | FW11 | 4440 | 8450 | 8450 | 0.060 | 38.1 |
| 8 | FW11 | 4440 | 8450 | 8450 | 0.020 | no weld |
| 9 | FW11 | 4440 | 8450 | — | 0.040 | 54.9 |
| 10 | FW11 | 3240 | 6400 | 6400 | 0.092 | note 1 |
| 11 | FW11 | 3240 | 6400 | 6400 | 0.208 | no weld |

TABLE 2-continued (Mo 13% Re Rod)

| Weld No. | Machine | Rim Speed in./min. | Friction Force, psi | Forge Force, psi | Burn-off inches | Weld UTS, ksi |
|---|---|---|---|---|---|---|
| 12 | FW11 | 3240 | 12800 | 12800 | 0.080 | no weld |
| 13 | FW11 | 4440 | 3840 | 3840 | 0.060 | note 1 |
| 14 | FW11 | 4440 | 14080 | 14080 | 0.160 | 83.8 |
| 15 | FW11 | 4440 | 14080 | 19200 | 0.160 | 82.2 |
| 16 | FW11 | 4440 | 14080 | 14080 | 0.240 | 71.0 |
| 17 | FW11 | 4440 | 19200 | 19200 | 0.240 | 83.1 |
| 18 | FW11 | 4440 | 19200 | 19200 | 0.160 | 79.9 |
| 19 | FW11 | 4440 | 14080 | 14080 | 0.160 | 85.3 |
| 20 | FW11 | 4440 | 14080 | 14080 | 0.160 | note 2 |
| 21 | FW11 | 4440 | 14080 | 14080 | 0.160 |  |

Note 1:
The weld failed a drop test, which comprised dropping the joined work pieces from a height of about 3 feet onto a steel plate, and was not tested further.
Note 2:
The weld was tested by being bent 90 degrees around a stationary cylindrical jig.

by using

EXAMPLE 3

Figure 6:
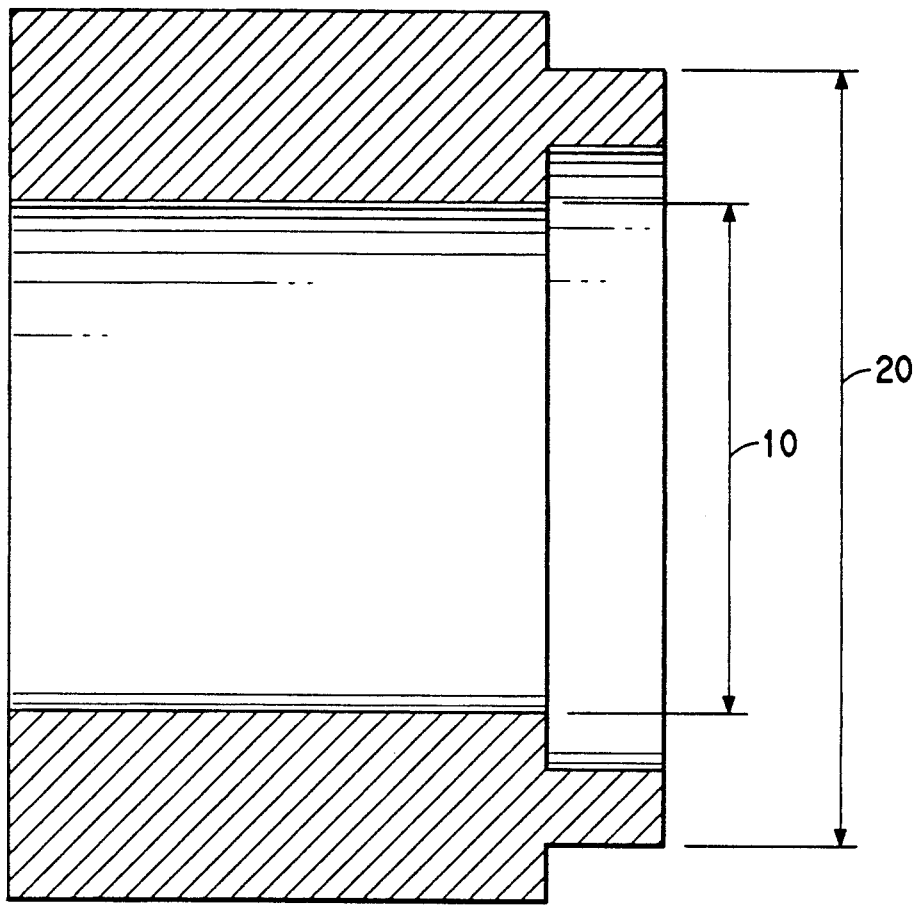
FIG. 6 is a cross-sectional drawing to scale which illustrates the design preparation that was used in accordance with Example 3.

In this Example, tests were carried out on two extruded and annealed Mo41%Re seamless pipes approximately 4.7 inches in outer diameter and 2.7 inches inner diameter. After the pipes were extruded, the pipes were annealed by being heated in a hydrogen-containing atmosphere to a temperature of about 1,100° C. which was maintained for about 3 hours. Prior to welding, the annealed pipes were cut, and dry machined into nominal 3.5 inch lengths. The exterior dimensions of the pipe were oversized so that the ends, which are to be welded together, could be machined to the dimensions or "Preparation Designations" that are shown in FIG. 6, and listed in the following TABLE 3. With the exception of the interior 10 and exterior 20 diameter of the protuberance on the end of the pipe, the dimensions of the pipe in FIG. 6 are drawn to scale. The interior and exterior dimensions of the protuberance are listed below in TABLE 3. The height of the protuberance is about 0.625 inch.

TABLE 3

| Preparation designation | Outside Diam. inches | Inside Diam. inches | Cross-Sect. Area. sq. in. |
|---|---|---|---|
| A | 4.5 | 3.5 | 6.3 |
| B | 4.6 | 3.38 | 7.9 |
| C | 4.25 | 3.5 | 4.5 |
| D | 4.0 | 3.5 | 3.0 |
| E | 4.25 | 3.46 | 4.6 |

Friction welding was performed by employing two friction welding machines (supplied by The Welding Institute, Abington Hall, United Kingdom); an FW3 which had a 100 HP transmission power, an a maximum axial load capacity of 224,000 lbs, and an FW6 which had a 400 HP transmission power, and a maximum axial load capacity of 358,400 lbs. The conditions which were used when welding the Mo41%Re pipes are summarized below in TABLE 4.

Weld 1 was made between two pipes by using friction welding machine FW6, and preparation design A. Weld 1 was formed by using a rim speed of about 5656 inches per minute, and a friction force of about 10,670 psi. While a weld was produced between the pipes, the weld failed when subjected to the 90 degree bent test. For purposes of comparison, two rods approximately 0.472 inch in diameter were prepared from the pipe material, and welded by using friction welding machine FW11 which produced weld 2. Weld 2 indicates that the pipe material was friction weldable, but produced a joint with low ductility and high tensile strength. Weld 3 was produced using preparation design B, and a higher rotation speed. Although weld 3 had a tensile strength of about 123 ksi, this weld did not survive being bend tested.

Figure 7:
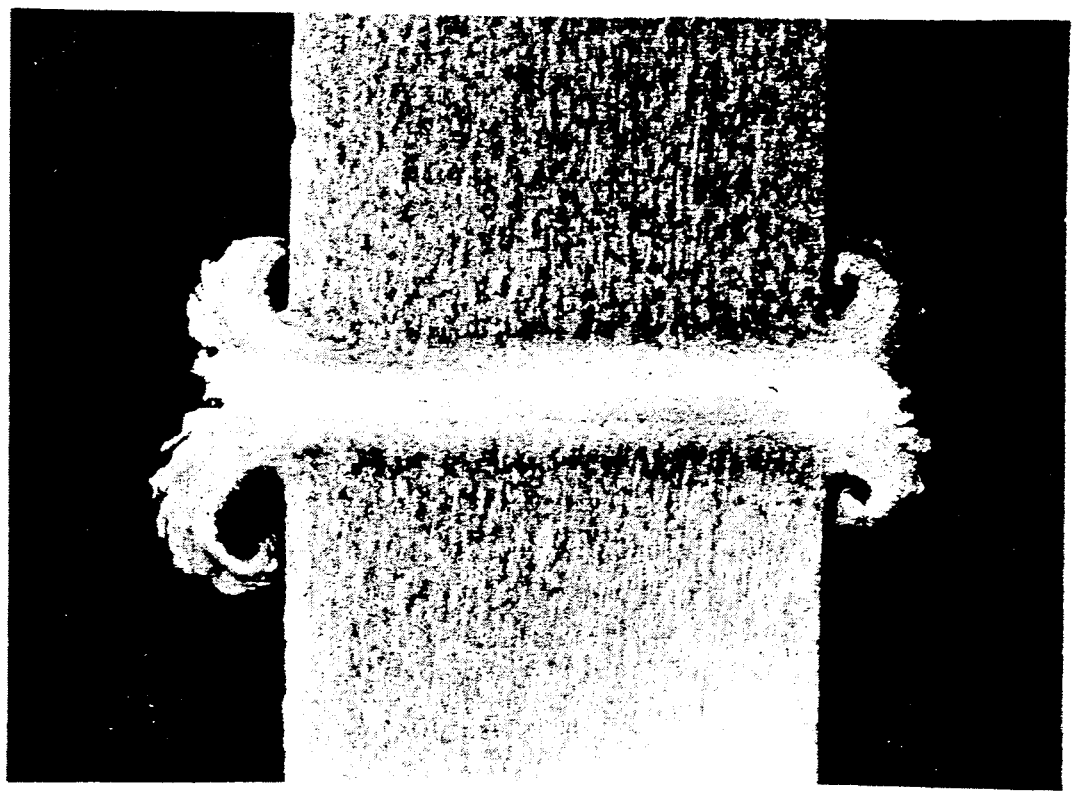
FIG. 7 is photomicrograph at 7× magnification which illustrates a friction weld formed between two MO41% Re pipes.

Weld 4 was sectioned, etched and polished for metallographic examination. FIG. 7 is a macrophotograph at 7× magnification of weld 4 which illustrates a successful weld, and formation of an upset about the exterior of the weld. The upset can be removed by machining.

In order to obtain improved results, the remaining tests were carried out by using a relatively more powerful FW6 friction welding machine. By using preparation design B, reducing the weld time to about 2 seconds, and increasing the forge force, weld 13 was obtained. Weld 13 had a tensile strength of about 138.6 ksi, and failed through the weld interface. Such a tensile strength is about 90% of parent metal strength, and was achieved without annealing the welded pipes. Notwithstanding the tensile strength, the weld did not survive being bend tested.

The bend test results were improved by annealing the weld. A portion of weld 13 was annealed at about 850° C. under a hydrogen-containing atmosphere for about 5 minutes, and a second portion of weld 13 was annealed under a hydrogen-containing atmosphere at about 960° C. for about 15 minutes. After annealing the welds, longitudinal specimens were cut from the pipe, and could be bent about 30 degrees before failure occurred at the weld interface. An improvement in the tensile strength of a section of weld 13 was achieved by annealing the welds at about 960° C. for 30 minutes. The later annealing step increased the tensile strength of the weld to about 153.5 ksi which is nearly equal to the parent metal strength.

Weld 14 to 15 were obtained by using preparation designs B through E, and produced an upset around the exterior of the weld. However, welds 14–15 failed when machined in order to remove the upset.

Weld 16 was obtained by using preparation design A which produced a weld, that did not survive the drop test. Weld 17 was formed under substantially the same conditions as Weld 16, except for an increased burnoff, i.e., about 0.118 inches instead of 0.80 inches, which produced a weld having a tensile strength of about 137.3 ksi or about 90% of parent metal strength. The results of this Example demonstrate that, when employing suitable conditions, welds can be obtained by friction welding Mo41%Re pipe, which achieves about 90% of parent metal strength and, if desired, the properties of the resultant welds can be further improved by annealing.

The conditions which were used to form welds in this Example are summarized below in Table 4:

TABLE 4

| | | | (Mo 41% Re Seamless Pipe) | | | | |
|---|---|---|---|---|---|---|---|
| Weld # | Prep. Des. | Machine | Rim Speed in./min. | Friction Force, psi | Forge Force, psi | Burnoff Inches | Weld UTS, ksi |
| 1 | A | FW6 | 5656 | 10670 | 12440 | — | note 1 |

TABLE 4-continued (Mo 41% Re Seamless Pipe)

| Weld # | Prep. Des. | Machine | Rim Speed in./min. | Friction Force, psi | Forge Force, psi | Burnoff Inches | Weld UTS, ksi |
|---|---|---|---|---|---|---|---|
| 3 | B | FW6 | 6503 | 8550 | 9970 | 0.118 | 123.0 |
| 4 | B | FW6 | 6503 | 7125 | 14250 | 0.080 | |
| 5 | A | FW3 | 4949 | 8530 | 10310 | 0.080 | no weld |
| 6 | C | FW3 | 4673 | 8460 | 10950 | 0.080 | no weld |
| 7 | D | FW3 | 6285 | 8960 | 13440 | 0.080 | note 2 |
| 8 | D | FW3 | 7542 | 5970 | 8960 | 0.080 | note 3 |
| 9 | D | FW3 | 7542 | 5970 | 8960 | 0.118 | note 2 |
| 10 | D | FW3 | 7542 | 7470 | 8960 | 0.118 | note 2 |
| 11 | D | FW3 | 7542 | 8960 | 11200 | 0.118 | note 3 |
| 12 | D | FW3 | 4400 | 8960 | 11200 | 0.118 | note 2 |
| 13 | B | FW6 | 6503 | 99970 | 14250 | 0.080 | 138.6 |
| 14 | B | FW6 | 6503 | 7120 | 14250 | 0.080 | note 3 |
| 15 | E | FW6 | 6008 | 12170 | 24350 | 0.080 | note 3 |
| 16 | A | FW6 | 7070 | 9960 | 17780 | 0.080 | note 2 |
| 17 | A | FW6 | 7070 | 9960 | 17780 | 0.118 | 137.3 |

Note 1:
The weld was used for a bend test by being bent around a stationary cylindrical jig.
Note 2:
Thw weld failed a drop test, which comprised dropping the joined work pieces from a height of about 3 feet onto a steel plate, and was not tested further.
Note 3:
The weld passed the drop test but failed when machined.

While a few embodiments of the invention have been described in detail, one of ordinary skill would recognize that other embodiments and variations are encompassed by the appended claims.

The following is claimed.

1. A process for friction welding a molybdenum alloy, which has a melting point that is greater than unalloyed molybdenum, comprising the steps of:
   providing a friction welding machine which includes a stationary chuck for holding one molybdenum alloy work piece, and a rotatable chuck for holding the second molybdenum alloy work piece,
   driving the rotatable chuck to a work piece rim surface speed of about 4,000 to 8,000 inches per minute relative to the stationary work piece,
   forcing the work pieces into frictional contact under an axially applied pressure of about 3,000 to 20,000 pounds per square inch at the interfacial surface of the work pieces,
   sustaining the axial pressure until a burnoff has occurred;
   allowing the work pieces to cool; thereby forming a weld between the work pieces, and wherein the process further comprises annealing at least one of said workpiece or weld.

2. A process for friction welding a molybdenum rhenium alloy in air comprising the steps of:
   providing a friction welding machine which includes a stationary chuck for holding one molybdenum rhenium alloy work piece, an a rotatable chuck for holding the second molybdenum rhenium alloy work piece,
   driving the rotatable chuck to a work piece rim surface speed of about 4,000 to 8,000 inches per minute relative to the stationary work piece,
   forcing the work pieces into frictional contact under an axially applied pressure of about 3,000 to 20,000 pounds per square inch at the interfacial surface of the work pieces, and;
   allowing the work pieces to cool; thereby forming a weld between the work pieces.

3. A process for friction welding a molybdenum alloy, which comprises about 10 to 50 wt % rhenium, in air comprising the steps of:
   providing a friction welding machine which includes a stationary chuck for holding one molybdenum rhenium alloy work piece, and a rotatable chuck for holding the second molybdenum rhenium alloy work piece,
   driving the rotatable chuck to a work piece rim surface speed of about 4,000 to 8,000 inches minute relative to the stationary work piece,
   forcing ends of the work pieces into frictional contact under an axially applied pressure,
   allowing the work pieces to cool; thereby forming a weld between the work pieces.

4. A process for friction welding a molybdenum alloy, which comprises about 10 to 50 wt % rhenium, in air comprising the steps of:
   providing a friction welding machine which includes a stationary chuck for holding one molybdenum rhenium alloy work piece, and a rotatable chuck for holding the second molybdenum rhenium alloy work piece,
   driving the rotatable chuck relative to the stationary work piece,
   forcing ends of the work pieces into frictional contact under an axially applied pressure of about 3,000 to 20,000 pounds per square inch at the interfacial surface of the work pieces, and;
   allowing the work pieces to cool; thereby forming a weld between the work pieces.

5. The process of claim 1,2,3, or 4 wherein said work piece comprises at least one member selected from the group consisting of a rod, pipe, and tube.

6. The process of claim 5 wherein said work piece comprises a pipe which has a cross-sectional diameter of at least about 5.0 inches, and a wall thickness of at least about 1.0 inch.

7. The process of claim 2, 3 or 4 further comprising annealing at least one of said work piece or weld.

8. The process of claim 1,2,3 or 4 further comprising at least one protuberance on the end of said work piece prior to friction welding.

9. The process of claim 1,2,3 or 4 further comprising machining the weld.

10. A product formed in accordance with claim 5, wherein the tensile strength of the weld is at least 90% of the work piece.

11. A product formed in accordance with claim 6, wherein the welded area of the pipe can be bent at leas 30 degrees prior to failure.

* * * * *